Patented May 20, 1947

2,420,720

UNITED STATES PATENT OFFICE 2,420,720

METHOD OF PREPARING COATED COMPOSITIONS

Alphonse Pechukas, Akron, and Paul J. Gegner, Barberton, Ohio, assignors to Pittsburgh Plate Glass Company, Pittsburgh, Pa., a corporation of Pennsylvania No Drawing. Application July 31, 1943, Serial No. 496,938

9 Claims. (Cl. 117—6)

This invention relates to a method of preparing coatings of water-insoluble film-forming materials containing polyunsaturated esters. The invention is especially concerned with the provision of a method of applying such polyunsaturated ester to a base and polymerizing the resulting coating under conditions such that the long periods of polymerization encountered in prior art processes are avoided.

According to this invention a base is provided with a synthetic resin surface by applying to the base a polyunsaturated polymerizable ester which contains at least two polymerizable unsaturated carbon-carbon radicals separated by an ester linkage, applying a coating of a water soluble film forming material such as an aqueous solution of polyvinyl alcohol, to the ester, whereby to form a water soluble film thereupon, polymerizing the ester and removing the water soluble film. As an embodiment of the invention herein contemplated, the method is utilized in applying coating compositions containing ingredients well known to the art, embodying a volatile vehicle or solvent such as benzol, xylene, petroleum ether, alcohols, ethyl acetate, turpentine, butyl acetate, toluene, etc., or miscible mixtures of the same and a film-forming solute which is water insoluble and has a polymerizable polyunsaturated ester as one of its constituents. Part of the film-forming solute may be any water-insoluble synthetic or natural resinous material such as an alkyd resin, cellulose ester, cellulose ether, phenol-formaldehyde resin, copal, shellac, colophony, etc., or it may be a polymerized olefinic compound such as polystyrene, polyvinyl ester, butadiene polymer, polyacrylic ester, acrylonitrile composition, polyisobutylene or a copolymer of any of the above, while the remainder of the solute comprises as a polymerizable constituent a water-insoluble neutral ester having two or more active unsaturated groups homogeneously distributed therein.

Suitable esters useful in the practice of this invention are the esters containing two or more active polymerizable unsaturated groups. The active polymerizable groups may be the radicals of unsaturated monohydroxy alcohols having the unsaturation in a straight carbon chain attached to the second carbon atom. Thus, esters having vinyl radicals or the radicals of allyl, methallyl, ethylallyl, chloroallyl, crotyl, cinnamyl, tiglyl, propargyl, chlorocinnamyl, phenylpropargyl, or bromoallyl alcohols are suitable. Esters containing radicals derived from unsaturated acids having active polymerizable groups attached to alpha carbon atoms such as acrylic, methacrylic, chloroacrylic, crotonic, tiglic, cinnamic, propiolic, phenylpropiolic, methylpropiolic, ethylacrylic, and bromoacrylic acids and the polycarboxylic acids such as maleic, fumaric, itaconic, citraconic, methylenemalonic.

The esters containing at least two of the above enumerated unsaturated radicals are of several distinct types. They may be unsaturated monohydric alcohol esters of unsaturated monocarboxylic acids such as allyl-acrylate, methallyl crotonate or chloroallyl methacrylate, etc. They may be the polyesters of unsaturated alcohol and polybasic acids such as diallyl phthalate, dimethallyl fumarate, dicrotyl maleate, diallyl carbonate, tetrallyl orthosilicate. Other esters which may be used are those made by interreaction of polyhydroxy compounds such as ethylene glycol, di-, tri-, and tetraethylene glycol, trimethylene glycol, 1,2-propylene glycol, the di-, tri-, and tetrapropylene glycols, the various butylene glycols, glycerol, polyglycerol, erythritol, etc., with the acrylic and substituted acrylic acids said compounds having at least two unsaturated acid radicals such as ethylene glycol diacrylate, diethylene glycol dimethacrylate, glycerol trichloroacrylate. Still further useful esters are the mixed saturated-unsaturated alcohol esters of unsaturated polycarboxylic acids such as ethyl allyl fumarate, methyl methallyl maleate and methyl allyl itaconate.

Other useful polyunsaturated compounds are the esters having two unsaturated polymerizable groups in which the properties of the polymers are modified by an ester chain between the unsaturated groups such as ethylene glycol bis (methyl fumarate) and similar compounds having other glycols (which term is intended to include polyglycols) and other unsaturated dicarboxylic acids and other short chain alkyl group substituted for the ethylene glycol, fumaric acid, and methyl alcohol respectively. Compounds such as diethylene glycol bis (allyl carbonate), ethylene glycol bis (methallyl phthalate) and compounds having the following molecular structures:

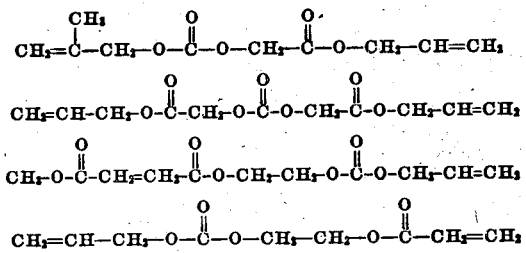

Other analogous compounds may also be used.

The principal film-forming ingredient of the coating composition may itself contain the unsaturation, thus, separate film-forming and polymerizable components are not always needed. For example, solid partially polymerized esters such as diallyl phthalate, diallyl carbonate and glycerol bis (allyl carbonates), may be dissolved in suitable volatile solvents and used as the coating composition without incorporating other resinous material. These partially polymerized soluble intermediates are more fully described in U. S. Patent 2,273,891 to Pollack et al.

The type of coating composition to which the method of this invention applies generally, contains a polymerization catalyst such as benzoyl or other acyl peroxide, acetone or other ketone peroxide or an organic percarbonate. The kind and quantity of catalyst will depend upon the nature and quantity of polymerizable constituent present. Generally, two-tenths of one percent to five percent by weight based on the polymerizable unsaturated compound in the coating composition will be sufficient to induce complete polymerization. The coating compositions may contain pigments, filler, dyes, or plasticizers as is well known in the art.

The invention is particularly suitable for the preparation of caustic resistant films utilizing a cellulose ether and particularly ethyl cellulose as a film forming constituent. These films are conventionally prepared by coating the surface to be protected with one or more coats of a liquid composition containing cellulose ethers, polyunsaturated esters, organic peroxy compounds and suitable volatile solvents and then drying to a non-tacky film by evaporation of the volatile solvent.

In the prior art, the curing or polymerization of the polyunsaturated ester necessary to develop the caustic resistant properties is effected by heating from four to eight hours, usually out of contact with air. This is accomplished by submerging the coated part in caustic alkali solution at 200 to 250° F. or in the case of lined containers by filling said container with the heated caustic. Compositions of this type and the methods of preparation are described in application Serial 437,284, filed April 1, 1942, by Irving E. Muskat which has matured into United States Letters Patent No. 2,379,246, granted June 26, 1945. As stated, the purpose in using caustic alkali is to exclude oxygen from the curing surface. Alternatively, this is accomplished by surrounding the surface with carbon dioxide or other inert gaseous atmosphere. These expedients are useful but they are difficult and expensive when large and/or irregularly shaped objects are being coated.

Accordingly, one of the purposes of this invention is to provide a method of curing the alkali insoluble coating which does not require the use of large and expensive installations.

We have discovered a new method which involves the steps of preparing coated compositions by the usual technique except that prior to the curing operation the coating is sprayed with a water solution of a film forming material and subsequently is cured in air. Suitable film forming materials are polyvinyl alcohol, polyallyl alcohol, or other polymerized alcohol, alginic acid, salts of alginic acid, acacia gum, gelatin, and gum tragacanth. Generally, any water soluble film-forming material is suitable. When completely covered the coating may be cured by heating in air or by any other convenient method without danger of incomplete polymerization. After the curing operation is completed the water soluble film may be washed off with water or in some cases may be peeled off of the cellulose film from which it separates quite readily.

The use of the water soluble films is not simply an alternative to the use of caustic and an inert atmosphere since very different results are obtained. For example, cellulose ether films cured at room temperature by standing in contact with caustic at 20° C. require a curing period of seven to nine days. For reasons as yet unexplained, the cures obtained by the present method are complete in thirty to forty hours at the same temperature. Similar savings in curing time are noticed at higher temperatures although shorter curing periods are required. The invention so shortens the time for a room temperature cure that it becomes practicable whereas the prior art has always considered heat cures to be essential. Accordingly, one of the objects achieved is the shortening of the time of cure.

Further details of the invention will be apparent in the following specific examples:

*Example I*

A paint containing 15% ethyl cellulose, 1.5% diethylene glycol dimethacrylate and 0.05% isopropyl percarbonate dissolved in a mixture of toluene, xylene and ethyl Cellosolve acetate was applied to a metal panel. The sample was dried at 20° C. in a dust proof atmosphere until the surface was tack-free. It was then dipped in a 10% solution of polyvinyl alcohol and allowed to drain. By heating in air at 75° C. for four hours a finally cured surface was obtained which was resistant to hot concentrated caustic solution. The film of polyvinyl alcohol was washed off with a water spray.

*Example II*

A second sample painted as in Example I was dipped in the polyvinyl alcohol solution and permitted to stand at 20° C. for 40 hours. The polyvinyl alcohol layer was loosened at one corner and entirely removed by peeling it off as a single sheet. A completely polymerized coating was thereby obtained.

*Example III*

The paint composition described in Example I was sprayed on a test panel and allowed to dry. A five percent gelatine solution was applied by dipping the test panel in the solution. It was then dried in air at 20° C. After heating at 40° C. for six hours the gelatine was washed off with water. A fully cured coating was thus obtained.

Although the invention is described with respect to specific examples it is not intended that the details of the same shall be construed as limitations on the scope of following claims.

We claim:
1. A method of preparing a caustic resistant coating upon a surface susceptible to attack by caustic which comprises applying to the surface a solution containing a polymerizable polyunsaturated ester which contains at least two polymerizable aliphatic carbon-carbon radicals in which the second carbon atom from an ester linkage is an atom of said radical, a polymerization catalyst for said ester, and a cellulose ether in a volatile organic solvent, drying the solution on the surface by evaporation of the organic solvent to leave on said surface a continuous coating, superposing an aqueous solution of a water soluble impervious film-forming material upon said coating, drying the solution by evaporation of the water to leave on the coating a continuous film, subjecting the coated surface to sufficient heat to polymerize the polyunsaturated ester contained in the coating, and thereafter removing the water soluble film from said coating.

2. A method of preparing a caustic resistant coating upon a surface susceptible to attack by caustic which comprises applying to the surface a solution containing a polymerizable polyunsaturated ester which contains at least two polymerizable aliphatic carbon-carbon radicals in which the second carbon atom from an ester linkage is an atom of said radical, a polymerization catalyst for said ester, and a cellulose ether in a volatile organic solvent, drying the solution on the surface by evaporation of the organic solvent to leave on said surface a continuous coating, superposing an aqueous solution of polyvinyl alcohol upon said coating, drying the solution by evaporation of the water to leave on the coating a continuous film, subjecting the coated surface to sufficient heat to polymerize the polyunsaturated ester contained in the coating, and thereafter removing the polyvinyl alcohol film from said coating.

3. A method of preparing a caustic resistant coating upon a surface susceptible to attack by caustic which comprises applying to the surface a solution containing a polymerizable ester selected from the group consisting of the glycol and polyglycol bis esters of acrylic and substituted acrylic acids, a polymerization catalyst for said ester, and ethyl cellulose in a volatile organic solvent, drying the solution on the surface by evaporation of the organic solvent to leave on said surface a continuous coating, superposing an aqueous solution of a water soluble impervious film-forming material upon said coating, drying the solution by evaporation of the water to leave on the coating a continuous film, subjecting the coated surface to sufficient heat to polymerize the polyunsaturated ester contained in the coating, and thereafter removing the water soluble film from said coating.

4. A method as defined in claim 3, wherein the polymerizable ester is glycol dimethacrylate.

5. A method as defined in claim 3, wherein the polymerizable ester is diethylene glycol dimethacrylate.

6. A method of providing a base with a synthetic resin surface, which comprises applying to a base a poly-unsaturated polymerizable ester which contains at least two polymerizable unsaturated carbon-carbon radicals separated by an ester linkage, said ester containing a polymerization catalyst for the ester, applying a coating of a water soluble film forming material to the ester, polymerizing the ester and removing the water soluble film from the polymerized ester.

7. A method of providing a base with a synthetic resin surface, which comprises applying to a base a polyunsaturated polymerizable ester which contains at least two polymerizable unsaturated carbon-carbon radicals separated by an ester linkage, said ester containing a polymerization catalyst for the ester, applying a coating of a water soluble film forming material to the ester, polymerizing the ester and washing the film from the polymerized ester with water.

8. A method of polymerization which comprises applying to a base a polyunsaturated polymerizable ester which contains at least two polymerizable unsaturated carbon-carbon radicals separated by an ester linkage, said ester containing a polymerization catalyst for the ester, applying a coating of polyvinyl alcohol to the ester, polymerizing the ester and removing the polyvinyl alcohol from the polymerized ester.

9. A method of polymerization which comprises applying to a base a polyunsaturated polymerizable ester which contains at least two polymerizable unsaturated carbon-carbon radicals separated by an ester linkage, said ester containing a polymerization catalyst for the ester, applying a coating of polyvinyl alcohol to the ester, polymerizing the ester and washing the polyvinyl alcohol from the polymerized ester with water.

ALPHONSE PECHUKAS.
PAUL J. GEGNER.

REFERENCES CITED

The following references are of record in the file of this patent:

UNITED STATES PATENTS

| Number | Name | Date |
|---|---|---|
| 2,103,841 | Calvert | Dec. 28, 1937 |
| 2,220,525 | Kauppi | Nov. 5, 1940 |
| 2,320,536 | Pollack | June 1, 1943 |
| 2,273,891 | Pollack | Feb. 24, 1942 |
| 2,276,519 | Sherk | Mar. 17, 1942 |
| 2,241,321 | Schlack | May 6, 1941 |

FOREIGN PATENTS

| Number | Country | Date |
|---|---|---|
| 102,375 | Austria | Nov. 11, 1937 |